Figure 1:
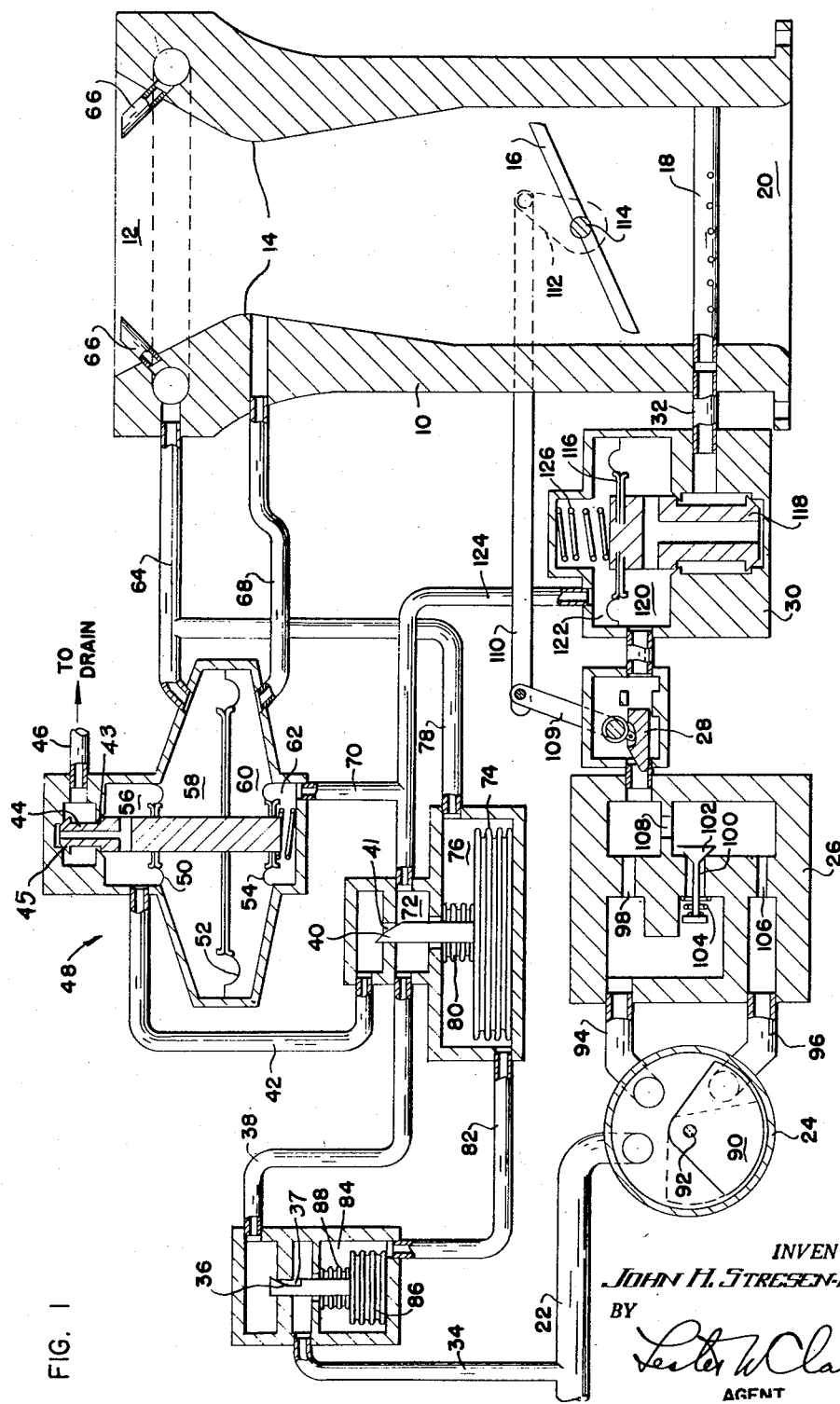

Aug. 21, 1951 — J. H. STRESEN-REUTER — 2,565,329
CARBURETORS
Filed Oct. 24, 1945 — 3 Sheets-Sheet 1

INVENTOR.
JOHN H. STRESEN-REUTER
BY
Lester W Clark
AGENT

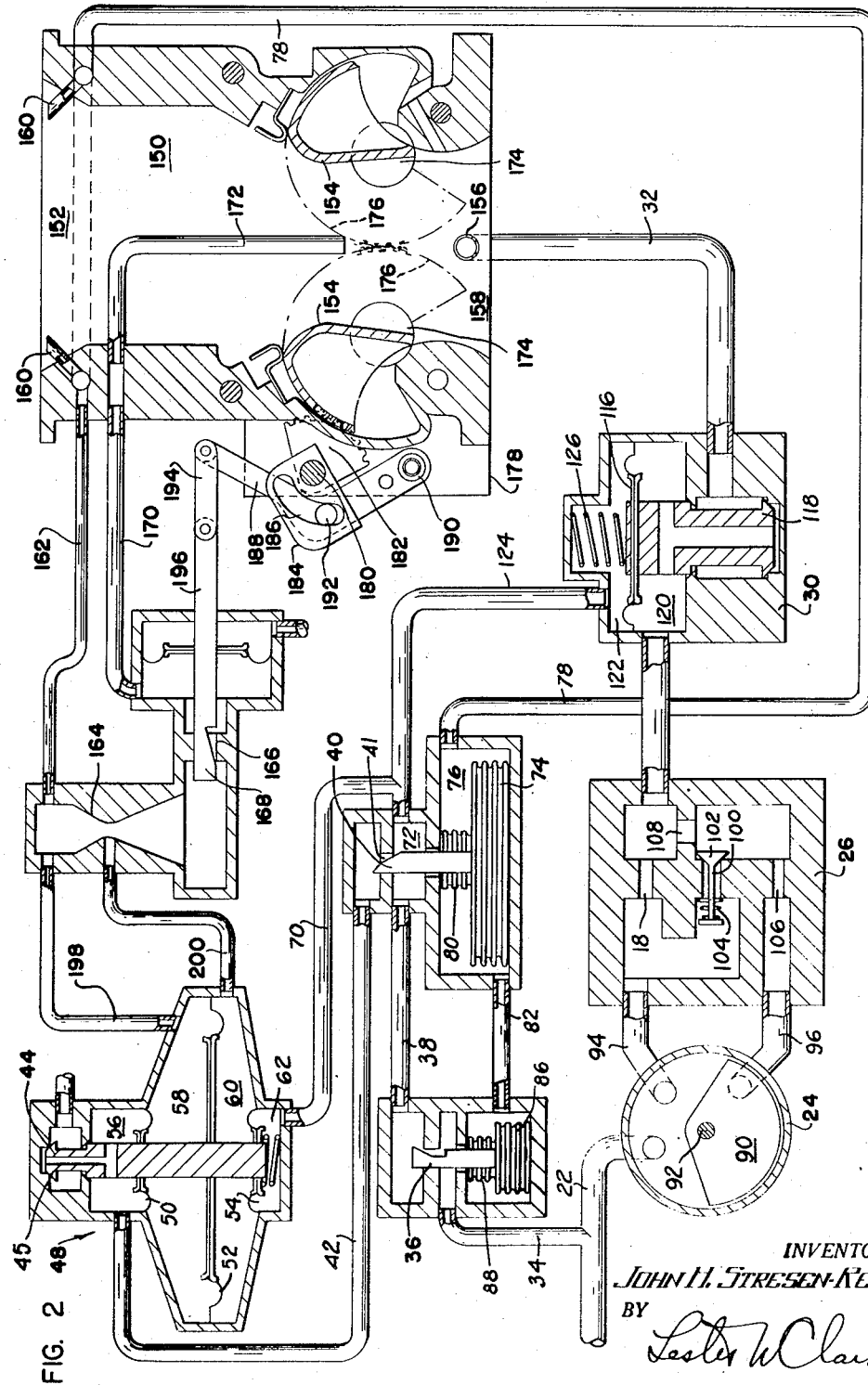

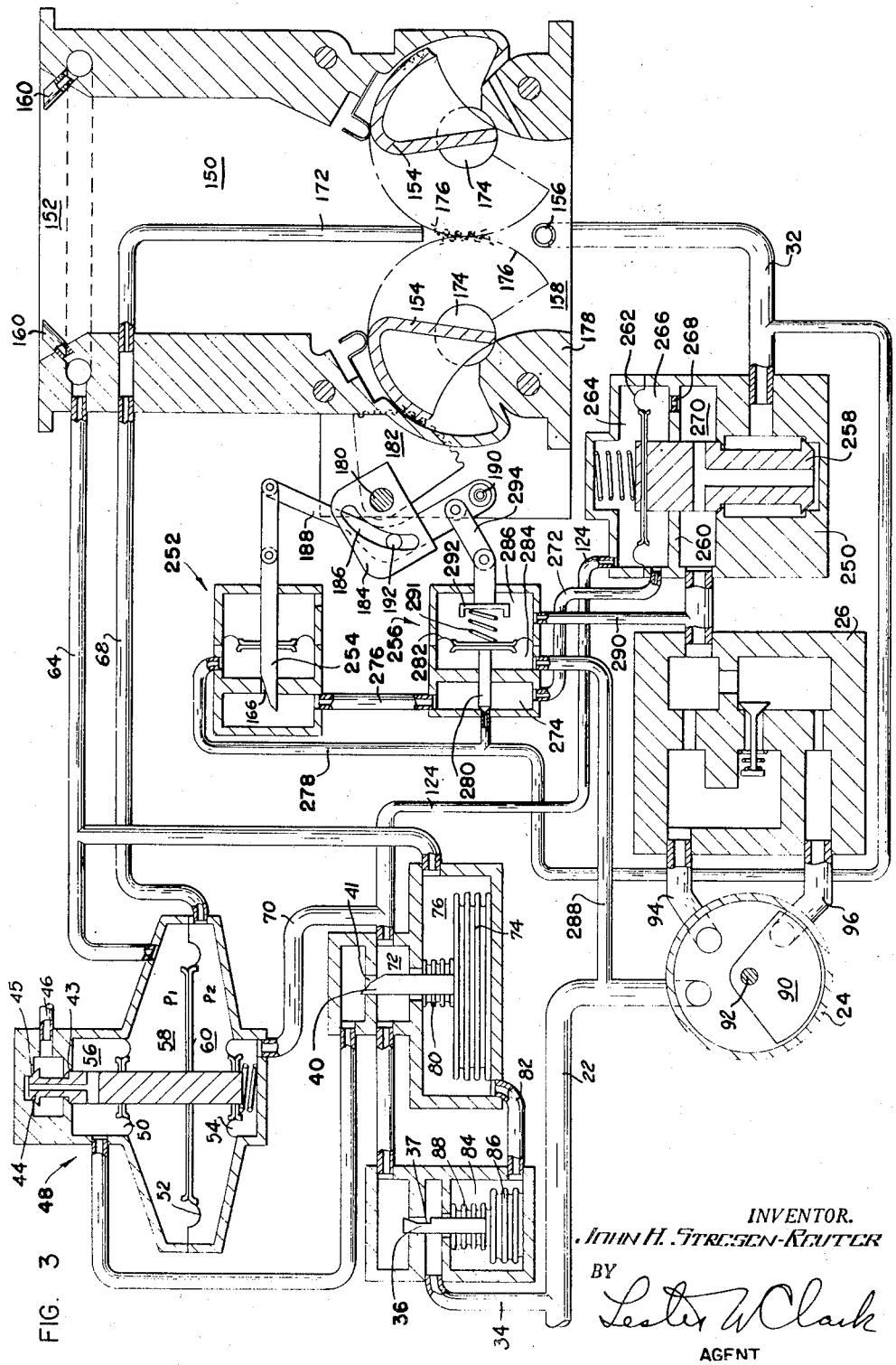

Patented Aug. 21, 1951

2,565,329

UNITED STATES PATENT OFFICE 2,565,329

CARBURETOR

John H. Stresen-Reuter, Golf, Ill., assignor, by mesne assignments, to Niles-Bement-Pond Company, West Hartford, Conn., a corporation of New Jersey Application October 24, 1945, Serial No. 624,179

11 Claims. (Cl. 261—39)

The present invention relates to carburetors for internal combustion engines, and also to air flow measuring apparatus for use in such carburetors.

In carburetors for internal combustion engines, it is usual to provide some means for measuring the rate of flow of combustion air to the engine, and to provide means responsive to the measured rate of air flow for controlling the fuel flow so as to maintain the fuel-air ratio substantially constant. It is also usual to provide either manual or automatic means, or both, for varying the fuel-air ratio within selected limits.

The density of the usual liquid fuel remains substantially constant, but the density of the air varies with its pressure and temperature. In order to maintain a constant fuel-air ratio, it is necessary to proportion the mass of air flowing per unit time to the mass of fuel flowing per unit time. The variations in the air density make it difficult to measure the mass of air flowing per unit time.

In carburetors for internal combustion engines the usual method of air flow measurement involves the use of a Venturi meter. Such Venturi meters are accurate only over a limited range of air flows. On large engines, such as those now in common use on aircraft, the range of variation of air flow between idling conditions and maximum power output conditions is very wide. If a fixed venturi is used, then it must be made large enough to measure the air flow at maximum power output. If so designed, it is too large to accurately measure the air flow under idling conditions. It has, therefore, been proposed to use a variable venturi for measuring the air flow, and to correct the air flow measuring apparatus for changes in the Venturi throat area. Such a variable Venturi carburetor is shown and claimed in my U. S. Patent No. 2,468,416, granted April 26, 1949, and assigned to the assignee of the present application.

It is an object of the present invention to provide improved means for measuring the mass flow of a fluid of variable density.

Another object is to provide such a flow measuring means which is adaptable to the measurement of air flow in a carburetor for an interal combustion engine.

A further object of the present invention is to provide an improved carburetor of the variable Venturi type.

A further object is to provide a carburetor including improved means for correcting the action of the carburetor for variations in the pressure and temperature of the combustion air entering the engine.

Other objects and advantages of the present invention will become apparent from a consideration of the appended specification, claims and drawings, in which Figure 1 shows, somewhat diagrammatically, a carburetor for an internal combustion engine, employing a fixed venturi and improved air pressure and temperature compensating means built in accordance with the principles of my invention, Figure 2 illustrates an arrangement in which the principles of the air flow measuring mechanism of Figure 1 are applied to a variable Venturi type of carburetor, and Figure 3 illustrates a modified form of my invention, wherein a variable Venturi carburetor is also used.

Figure 1

Referring to the drawing, there is shown an air passage 10 thru which air flows from an entrance 12, past a fixed Venturi restriction 14, a throttle 16, and a fuel discharge nozzle 18 to a mixture outlet 20.

A supercharger is commonly used between the mixture outlet 20 and the intake manifold of the engine. In some cases the supercharger is mounted ahead of the entrance 12, or two superchargers may be used, one in each location.

Fuel flowing to the engine comes from a pump provided with means for maintaining a substantially constant discharge pressure and flows thru a conduit 22, a mixture control 24, a jet system 26, an idle valve 28, a fuel regulating valve 30, and a conduit 32 to the discharge nozzle 18.

A control conduit conducts fuel from the constant pressure source thru a conduit 34, past a contoured valve 36 cooperating with a restriction 37, thru a conduit 38, past a contoured valve 40 cooperating with a restriction 41, thru a conduit 42, and past a valve 44 cooperating with restrictions 43 and 45 to a drain conduit 46. The drain conduit 46 may lead back to the fuel tank or to any other suitable location. If desired, the conduit 34 may be connected to a source of oil or any other substantially incompressible fluid maintained under substantially constant pressure, instead of being connected, as shown, to the conduit 22.

Valve 44 is a part of a pressure meter unit generally indicated at 48. The pressure meter 48 includes three flexible diaphragms, 50, 52 and 54, separating four expansible chambers 56, 58, 60 and 62. The diaphragms 50, 52 and 54 are attached at their centers to the stem of valve 44. Chamber 58 is connected through a conduit 64 to a plurality of impact tubes 66 whose ends open in a direction to receive the impact of the air flowing into the entrance 12. The chamber 60 is connected thru a conduit 68 to the throat of venturi 14. The chamber 62 is connected thru a conduit 70 to a chamber 72 in the control conduit on the upstream side of valve 40. Chamber 56 is connected to conduit 42 and, therefore, is supplied with fuel at the pressure existing in the control conduit on the downstream side of valve 40. The pressure meter 48 operates the valve 44 to control the flow thru the control conduit so as to maintain a pressure drop across valve 40 which is proportional to the air pressure differential set up between the entrance and throat of venturi 14.

The valve 40 is positioned by a flexible bellows 74. The bellows 74 is evacuated and mounted in a chamber 76, connected thru a conduit 78 to the conduit 64 and thence to the impact tubes 66. A sealing bellows 80 is provided around the stem of valve 40 to prevent leakage of fuel from chamber 72 into chamber 76. The lower end of bellows 80 is fixed to bellows 74 and has its upper end suitably apertured to permit free passage of valve 40 thru the upper end of bellows 80 which is fixed to the correspondingly apertured upper end of chamber 76. Bellows 80 has minimum possible effective area in order to minimize control of valve 40 as a function of fluid pressures acting upon the sealing bellows. If desired, the sealing bellows 80 may be omitted and replaced by a sliding fit seal between the upper wall of chamber 76 and the stem of valve 40.

Chamber 76 is also connected thru a conduit 82 to a chamber 84 in which is mounted a sealed bellows 86. The bellows 86 is filled with some fluid having a high coefficient of thermal expansion, so that it expands and contracts in accordance with the temperature of the air in chamber 84. Additional means may be provided, if required, to ventilate the chamber 84 so as to maintain the air temperature in it substantially the same as that of the air passing thru the venturi 14. The bellows 86 positions the valve 36. A sealing bellows 88, corresponding to sealing bellows 80 in chamber 76, is provided around the stem of valve 36 to prevent leakage of fuel into the chamber 84. Again, the sealing bellows may be replaced by a sliding fit seal, if desired.

The mixture control 24 includes a disc valve 90 fixed on a rotatable shaft 92. When the valve 90 is in the full line position on the drawing, fuel may flow thru the mixture control unit to the jet system 26 only thru a conduit 94. The valve 90 may be moved by rotation of shaft 92 to the position shown in dotted lines in the drawing, whereupon fuel may flow to the jet system 26 thru conduit 94 and thru another conduit 96. The full line position of disc 90 is known as its "lean" position and the dotted line position is known as its "rich" position. The valve 90 may also be moved to a cut off position in which it prevents the flow of fuel thru either conduits 94 or 96.

Fuel entering the jet system thru the conduit 94 passes thru a jet or restriction 98. This fuel may also pass thru a restriction 100 controlled by a valve 102, which is biased to closed position by a spring 104. Fuel entering the jet system thru conduit 96 passes thru a fixed restriction 106. Fuel passing thru the restrictions 100 and 106, passes thru another fixed restriction 108.

The idle valve 28 may be reciprocated by a lever 109 connected by a link 110 to an arm 112 mounted on the shaft 114 which carries the throttle 16.

The fuel regulating valve 30 includes a diaphragm 116 attached at its center to a valve 118 which is balanced against discharge pressure. Fuel from the jet system 26 enters a chamber 120 under the diaphragm 116. A chamber 122 above the diaphragm 116 is connected thru a conduit 124 to the chamber 72 in the control conduit on the upstream side of valve 40. A spring 126 biases the valve 118 for movement toward a closed position.

*Operation of Figure 1*

Considering the control conduit which includes the valves 36, 40 and 44 in series, it may be seen, as previously explained, that the pressure drop across valve 40 is maintained proportional to the air pressure differential set up by venturi 14 by the action of the pressure meter 48. Furthermore, it may be seen that the fuel regulator 30 acts to maintain the fuel pressure on the downstream side of jet system 26 equal (neglecting the effect of spring 126) to the pressure in the control line on the downstream side of valve 36. Since the fuel pressure on the upstream side of jet system 26 is the same as that on the upstream side of valve 36, it may be seen that the pressure drop across valve 36 is the same as the fuel pressure differential across the jet system 26.

In all of the following mathematical analyses, fuel pressures may be expressed either as absolute or gage, one measure or the other being used exclusively. On the other hand, air pressures are designated only in absolute units of measure. In cases in which pressures appear as differentials any common unit of measure is permissible, but air pressure ratios require use of absolute units of measure. Let:

$P_1$ = fuel inlet pressure, abs. or gage.
$P_2$ = fuel pressure on downstream side of valve 36, abs. or gage (equals fuel pressure on downstream side of jet system 26)
$P_3$ = fuel pressure on downstream side of valve 40, abs. or gage
$A_t$ = area of orifice formed by valve 36
$A_p$ = area of orifice formed by valve 40
$p_1$ = air pressure at entrance 12, absolute
$p_2$ = air pressure at Venturi throat 14, absolute
$K_1, K_2, K_3$ etc. = various constants
$t$ = absolute temperature of the air flowing thru venturi 14.

The same quantity of fuel flows thru both valves 36 and 40. The quantity of fluid flowing thru an orifice may be expressed by the equation $$Q = KA\sqrt{dp}$$

where $K$ is a constant, $A$ is the area of the orifice and $dp$ is the pressure drop across the orifice. Therefore, it may be stated that $$K_1 A_t \sqrt{P_1 - P_2} = K_2 A_p \sqrt{P_2 - P_3} \quad (1)$$

or $$\frac{P_1 - P_2}{P_2 - P_3} = K_3 \frac{A_p^2}{A_t^2} \quad (2)$$

Now if valve 36 is contoured so that $A_t = K_4 \sqrt{t}$ and if valve 40 is contoured so that $A_p = K_5 \sqrt{p_1}$, then by substituting these values in (2), $$\frac{P_1 - P_2}{P_2 - P_3} = K_3 \frac{K_5^2 p_1}{K_4^2 t} = K_6 \frac{p_1}{t} \quad (3)$$

but, $$P_2 - P_3 = K_7(p_1 - p_2) \quad (4)$$

because of the action of pressure meter 48. Substituting (4) in (3), we get $$\frac{P_1-P_2}{K_7(p_1-p_2)}=K_6\frac{p_1}{t}$$

or, $$\frac{P_1-P_2}{p_1-p_2}=K_8\frac{p_1}{t} \qquad (5)$$

It may be proven that if the relationship set forth in Equation 5 is maintained, the mass of fuel flowing per unit time will be proportioned to the mass of air flowing, with negligible error. One method of proving this follows:

The mass of air flowing per unit time thru a fixed restriction may be determined from the following mathematical relationship which is shown, for example, in Marks' "Mechanical Engineers Handbook," third edition (1930), page 2057:

$$W=\frac{A_2p_1}{\sqrt{t_1}}\sqrt{2g\frac{k}{k-1}\frac{1}{R}\left[\left(\frac{p_2}{p_1}\right)^{\frac{2}{k}}-\left(\frac{p_2}{p_1}\right)^{\frac{k+1}{k}}\right]} \qquad (6)$$

where
W = the mass of air flowing per unit time
A = cross-sectional area
$p_1$ = total (dynamic) pressure at the orifice entrance, absolute
$p_2$ = static pressure at the orifice throat, absolute
$t$ = absolute temperature
$g = 32.15$
$k$ = ratio of specific heat at constant pressure to specific heat at constant volume
R = gas constant
Subscript 1 refers to conditions at orifice entrance and
Subscript 2 refers to conditions at orifice throat.

Equation 6 above reduces to $$W=K_9\frac{A_2p_1}{\sqrt{t_1}}\sqrt{\left(\frac{p_2}{p_1}\right)^{\frac{2}{k}}-\left(\frac{p_2}{p_1}\right)^{\frac{k+1}{k}}} \qquad (7)$$

In order to simplify the expression appearing under the radical in Equation 7, each of the terms appearing therein may be expanded according to Taylor's series, and all except the first three terms in each series dropped. Expanding the first term under the radical, we get $$\left(\frac{p_2}{p_1}\right)^{\frac{2}{k}}=1+\frac{2}{k}\left(\frac{p_2}{p_1}-1\right)+\frac{1}{k}\left(\frac{2}{k}-1\right)\left(\frac{p_2}{p_1}-1\right)^2 \qquad (8)$$

and expanding the second term under the radical, we get $$\left(\frac{p_2}{p_1}\right)^{\frac{k+1}{k}}=1+\frac{k+1}{k}\left(\frac{p_2}{p_1}-1\right)+\frac{k+1}{k^2}\cdot\frac{1}{2}\cdot\left(\frac{p_2}{p_1}-1\right)^2 \qquad (9)$$

Subtracting Equation 9 from Equation 8, we find $$\left(\frac{p_2}{p_1}\right)^{\frac{2}{k}}-\left(\frac{p_2}{p_1}\right)^{\frac{k+1}{k}}=$$
$$\left(\frac{p_1-p_2}{p_1}\right)\left(\frac{k-1}{k}\right)\left[1-\left(\frac{p_1-p_2}{p_1}\right)\frac{3}{2k}\right] \qquad (10)$$

Substituting Equation 10 in Equation 7, we get $$W=K_9A_2\sqrt{\frac{p_1^2}{t_1}\left(\frac{p_1-p_2}{p_1}\right)\left(\frac{k-1}{k}\right)\left[1-\left(\frac{p_1-p_2}{p_1}\right)\frac{3}{2k}\right]} \qquad (11)$$

Simplifying, $$W=K_{10}A_2\sqrt{\frac{p_1}{t_1}(p_1-p_2)\left[1-\left(\frac{p_1-p_2}{p_1}\right)\frac{3}{2k}\right]} \qquad (12)$$

If the range of variation of the ratio between the entrance and throat pressures at the venturi is limited, a median value of that ratio may be selected and substituted in the expression appearing in the brackets in Equation 12. It has been found, that if the range of variation of that ratio is limited from 0.6 to 1.0, that the total error introduced by the use of 0.8 as a fixed value for that ratio may be made negligibly small. The error introduced by the dropping of the extra terms in the expansion according to Taylor's series is likewise small. Equation 12 then becomes $$W=K_{10}A_2\sqrt{\frac{p_1}{t_1}(p_1-p_2)K_{11}} \qquad (13)$$

This equation expresses the mass of air flowing per unit time in terms of the pressure differential set up in the air venturi, the pressure and temperature of the air at the Venturi entrance, and the Venturi throat area.

The mass of fuel flowing per unit time may be expressed as follows:

$$F=K_{11}A_m\sqrt{P_1-P_2} \qquad (14)$$

Where F equals the mass fuel flow per unit time and $A_m$ is the area of the fuel metering orifice 98. Since the fuel metering orifice area is constant, Equation 14 may be written $$F=K_{12}\sqrt{P_1-P_2} \qquad (15)$$

The fuel-air ratio may be obtainable by dividing Equation 15 by Equation 13, which gives $$\frac{F}{W}=\frac{K_{12}\sqrt{P_1-P_2}}{K_{10}A_2\sqrt{\frac{p_1}{t_1}(p_1-p_2)K_{11}}} \qquad (16)$$

If the fuel-air ratio is to be maintained constant then $$\frac{K_{12}}{K_{10}A_2}\frac{\sqrt{P_1-P_2}}{\sqrt{\frac{p_1}{t_1}(p_1-p_2)K_{11}}}=K_{13} \qquad (17)$$

For a venturi of fixed cross-sectional area, such as the venturi 14 of Figure 1, the term $A_2$ in Equation 17 is constant so that this equation may be expressed as $$\frac{P_1-P_2}{p_1-p_2}=K_{14}\frac{p_1}{t_1} \qquad (18)$$

It may be seen that Equation 18 is the same as Equation 5, which sets forth the relationship obtained in the carburetor of Figure 1.

Therefore, it may be seen that that carburetor maintains a substantially constant fuel-to-air ratio.

*Figure 2*

In Figure 2 the principles developed for use in the fixed Venturi carburetor of Figure 1 are applied to a variable Venturi carburetor. By the use of a variable venturi, the range of pressure ratio obtained at the venturi may be limited more than the range of ratios in a fixed venturi, for the same range of air flow variation.

As a corollary, it may be stated that for the same range of variation in the pressure ratio at the venturi, a wider range of air flows may be obtained with a variable Venturi carburetor.

However, the use of a variable venturi necessitates the introduction of mechanism to compensate for the variation in the term A₂, which was assumed constant in making the transformation from Equation 17 to Equation 18 above. Such a mechanism for compensating for variation in the Venturi throat area is shown in Figure 2.

Referring to the drawing, there is shown in Figure 2, an air passage 150, which extends from the air entrance 152 past a pair of variable Venturi bars 154, and a fuel discharge nozzle 156 to an outlet 158.

The pressure differential established between the entrance 152 and the throat of the variable venturi formed by bars 154 is used to induce a flow of air thru a secondary air passage. This secondary air passage may be traced from a number of impact tubes 160, whose ends are open to the impact of the flowing air passing into the entrance 152 and then thru a conduit 162, a boost venturi 164 thru an orifice 166 controlled by a valve 168, and then thru a conduit 170 to a tube 172 which discharges into the throat of the variable venturi.

The Venturi bars 154 are mounted on shafts 174. The shafts 174 carry, outside the passage 150, a pair of mating gear sectors 176, so that the two bars rotate together. There is mounted on the body 178, thru which the passage 150 extends, a shaft 180 carrying a sector gear 182 which engages one of the gears 176. The shaft 180 also carries a block 184 in which a cam slot 186 is formed. An arm 188 is pivoted at 190 in the body 178, and carries a pin 192 which rides in the slot 186. The free end of arm 188 is pivotally connected to a link 194, whose opposite end is connected to the stem 196 of the valve 168.

It may be seen that as the Venturi bars are rotated to increase the area of the Venturi throat, the sector gear 182 is rotated clockwise. The groove 186 is contoured so that upon clockwise rotation of shaft 180, the arm 188 is moved counter-clockwise. This moves the valve stem 196 to the left, thereby increasing the area of the orifice 166. From the foregoing it may be seen that as the Venturi throat area is increased, the air flow thru the boost venturi 164 is proportionally increased by the action of valve 168. The action of the carburetor is thereby compensated for the different relationship between the rate of air flow and the air differential pressure at the venturi which exists at each different position of the variable venturi.

The pressure differential appearing between the entrance and throat of the boost venturi 164 is communicated thru conduits 198 and 200 to a pressure meter 48, which corresponds in structure and in function to the pressure meter 48 of Figure 1.

The fuel flowing thru the carburetor of Figure 2 passes thru a mixture control unit 24, a jet system 26, and a fuel regulator valve 30. There is also provided a control conduit including a temperature control valve 36, a pressure control valve 40, and a valve 44 of pressure meter 48. These elements correspond to the elements having the same reference characters in Figure 1, and it is believed that no further description is necessary.

*Figure 3*

With a variable Venturi carburetor, such as that shown in Figure 2, it is possible that under certain conditions, as, for example, when the engine is being driven by its load, that the air differential pressure set up in the venturi will exceed the range over which the carburetor accurately maintains a constant fuel-air ratio.

It may, therefore, be desirable to provide means for limiting the fuel flow which can be obtained in this carburetor at any given position of the variable venturi. Such an arrangement is shown in Figure 3.

There is also shown in Figure 3, an arrangement for correcting the action of the carburetor for variations in the Venturi throat area, which may be used as an alternative to the valve 168 of Figure 2.

Those parts of the structure shown in Figure 3, which correspond fully to parts shown and described in connection with Figures 1 and 2 have been given the same reference characters in Figure 3 as in Figures 1 and 2, and those parts of the structure of Figure 3 will not be further described. The new structure in Figure 3 includes a new fuel regulator valve 250, a new Venturi throat area compensating mechanism generally indicated at 252, and including a valve 254 operated by arm 188, and a fuel flow limiting mechanism 256, also operated by arm 188.

The fuel regulator 250 includes a balanced valve 258 which extends thru a partition 260, and is attached to a flexible diaphragm 262 separating a pair of expansible chambers 264 and 266. A fixed restriction 268 interconnects the chamber 266 with an inlet chamber 270. Fuel flows from the inlet chamber 270 thru restriction 268 and thence thru chamber 266, a conduit 272, a chamber 274 in the fuel flow limit control 256, a conduit 276, past valve 254 in the Venturi area compensating mechanism 252 and then thru a conduit 278 to the fuel conduit 32 on the downstream side of the fuel regulating valve 250.

It may be observed that the pressure on the upstream side of valve 40 in the control conduit, is communicated to chamber 264 of regulator 250, where it is balanced against the pressure in chamber 266, which is smaller than the pressure on the downstream side of jet system 26 because of the pressure drop thru restriction 268. The pressure drop thru restriction 268 is controlled by the Venturi throat area compensating valve 254, to correct the action of the fuel regulator 250 for variations in the Venturi throat area.

The fuel flow limiting mechanism 256 includes a valve 280 attached to a diaphragm 282, which separates a pair of chambers 284 and 286. The chamber 284 is connected thru a conduit 288 to the fuel line on the upstream side of the jet system 26. The chamber 286 is connected thru a conduit 290 to the fuel line on the downstream side of the jet system 26. The fuel pressure differential, therefore, acts to the right on diaphragm 282 in a direction to open valve 280. The force of the fuel pressure differential is opposed by a spring 291, which is controlled by the position of a retainer 292, connected by a link 294 to the arm 188.

It may be seen that when the fuel pressure differential reaches a value determined by the setting of spring 291, the valve 280 opens thereby decreasing the pressure in chamber 266 and causing the valve 258 to move in a flow decreasing direction. This movement continues until the decrease in fuel flow is reflected in a decrease in the fuel pressure differential acting on diaphragm 282.

It may, therefore, be seen that each position of the variable venturi sets a new value for the force applied to diaphragm 282 by spring 291, and thereby establishes the maximum value which the fuel pressure differential can reach. This sets the maximum fuel flow for a given condition of the jet system 26 and mixture control unit 24.

While I have shown and described certain preferred embodiments of my invention, other modifications thereof will readily occur to those skilled in the art, and I, therefore, intend my invention to be limited only by the appended claims.

I claim as my invention:

1. A carburetor for an internal combustion engine, comprising a conduit for combustion air flowing to said engine, means associated with said air conduit for producing two unequal air pressures whose difference is a measure of the velocity of the air flowing therethru, a conduit for supplying fuel under pressure to said engine, a metering restriction in said fuel conduit for regulating the flow of fuel therethru in accordance with the fuel pressure differential established across said restriction, a control conduit connecting said fuel conduit upstream of said restriction to a drain, two variable restrictions in series in said control conduit, first valve means responsive to the higher of said unequal air pressures for varying one of said variable restrictions, second valve means responsive to the temperature of the air entering said air conduit for varying the other of said variable restrictions, means hydraulically connected across said first valve means and in series with said second valve means, and responsive to the difference of said two air unequal pressures, for controlling the flow thru said control conduit so as to maintain the pressure drop across said one restriction proportional to said difference of pressures, and means including a hydraulic pressure connection from said control conduit, between said first and second restrictions, to said fuel conduit downstream from said metering restriction, and responsive to the pressure drop across said other restriction, for controlling the fuel pressure differential across said metering restriction.

2. A carburetor for an internal combustion engine, comprising a conduit for combustion air flowing to said engine, variable Venturi means in said air conduit for producing two unequal air pressures whose difference varies with the velocity of the air flowing therethru and with the area of said variable Venturi means, a conduit for fuel flowing to said engine, a metering restriction in said fuel conduit for regulating the flow of fuel therethru in accordance with the fuel pressure differential established across said restriction, a source of a substantially incompressible fluid under pressure, a control conduit connecting said source to a drain, two variable restrictions in series in said control conduit, first valve means responsive to the higher of said unequal air pressures for varying one of said variable restrictions, second valve means responsive to the temperature of the air entering said air conduit for varying the other of said variable restrictions, means hydraulically connected across said first valve means and in series with said second valve means, and responsive to the difference of said two unequal air pressures for controlling the flow thru said control conduit so as to maintain the pressure drop across said one restriction proportional to said difference of pressures, means including a hydraulic pressure connection from said control conduit, between said first and second restrictions, to said fuel conduit downstream from said metering restriction, and responsive to the pressure drop across said other restriction for controlling the fuel pressure differential across said metering restriction, means connected to one of said controlling means and operated concurrently with movement of said variable Venturi means for correcting the action of said fuel pressure differential controlling means in accordance with variations in area of said Venturi means, and means for limiting the fuel pressure differential across said metering restriction as a function of the area of said variable Venturi means.

3. A carburetor for an internal combustion engine, comprising a conduit for combustion air flowing to said engine variable Venturi means in said air conduit for producing two unequal air pressures whose difference varies with the velocity of the air flowing therethru and with the area of said variable Venturi means, a conduit for fuel flowing to said engine, a metering restriction in said fuel conduit for regulating the flow of fuel therethru in accordance with the fuel pressure differential established across said restriction, a control conduit leading from said fuel conduit at the upstream side of said restriction to a drain, two variable restrictions in series in said control conduit, first valve means responsive to the higher of said unequal air pressures for varying one of said variable restrictions, second valve means responsive to the temperature of the air entering said air conduit for varying the other of said variable restrictions, a secondary air conduit leading from the entrance to the throat of said variable Venturi means and having a flow of air induced therethru by the difference of said two unequal pressures, a fixed restriction and a variable restriction in series in said secondary air conduit, means for varying said last-mentioned restriction concurrently with the variation of said variable Venturi means, means hydraulically connected across said first valve means and in series with said second valve means, and responsive to the pressure drop across the fixed restriction in said secondary air conduit, for controlling the flow thru said control conduit so as to maintain the pressure drop across said one variable restriction therein proportional to the pressure drop across the fixed restriction in said secondary air conduit, and means, including a hydraulic pressure connection from said control conduit, between said first and second restrictions, to said fuel conduit downstream from said metering restriction, and responsive to the pressure drop across the other variable restriction in said control conduit for controlling the fuel pressure differential across said metering restriction.

4. A carburetor for an internal combustion engine, comprising a conduit for combustion air flowing to said engine, variable Venturi means in said air conduit for producing two unequal air pressures whose difference varies with the velocity of the air flowing therethru and with the area of said variable Venturi means, a conduit for fuel flowing to said engine, a metering restriction in said fuel conduit for regulating the flow of fuel therethru in accordance with the fuel pressure differential established across said restriction, a control conduit leading from said fuel conduit at the upstream side of said restriction to a drain, two variable restrictions in series in said control conduit, first valve means responsive to the higher of said unequal air pressures for varying one of said variable restrictions, second valve means responsive to the temperature of the air entering said air conduit for varying the other of said variable restrictions, means hydraulically connected across said first valve means and in series with said second valve means, and responsive to the difference of said two unequal pressures for controlling the flow thru said control conduit so as to maintain the pressure drop across said one restriction proportional to said difference of pressures, means for regulating a variable fuel pressure in accordance with the area of said venturi, and means, including a hydraulic pressure connection from said control conduit, between said first and second restrictions, to said fuel conduit downstream from said metering restriction, and responsive to the difference between said regulated pressure and the pressure in said control conduit on the downstream side of said other restriction for controlling the fuel pressure differential across said metering restriction.

5. A carburetor for an internal combustion engine, comprising a conduit for combustion air flowing to said engine, means associated with said air conduit for producing two unequal air pressures whose difference is a measure of the velocity of the air flowing therethru, a conduit for fuel flowing to said engine, a metering restriction in said fuel conduit for regulating the flow of fuel therethru in accordance with the fuel pressure differential established across said restriction, a control conduit leading from said fuel conduit at the upstream side of said restriction to a drain, two variable restrictions in series in said control conduit, first valve means responsive to the higher of said unequal air pressures for varying one of said variable restrictions, second valve means responsive to the temperature of the air entering said air conduit for varying the other of said variable restrictions, means hydraulically connected across said first valve means and in series with said second valve means, and responsive to the difference of said two unequal pressures for controlling the flow thru said control conduit so as to maintain the pressure drop across said one restriction proportional to said difference of pressures, a valve in said fuel conduit downstream from said metering restriction, and means, including a hydraulic pressure connection from said control conduit, between said first and second restrictions, to said fuel conduit downstream from said metering restriction, and responsive to the pressure in said control conduit downstream from said other restriction and to the pressure in said fuel conduit downstream from said metering restiction for operating said valve to control the fuel pressure differential across said metering restriction.

6. A carburetor for an internal combustion engine, comprising a conduit for combustion air flowing to said engine, means associated with said air conduit for producing two unequal air pressures whose difference is a measure of the velocity of the air flowing therethru, a conduit for fuel flowing to said engine, a metering restriction in said fuel conduit for regulating the flow of fuel therethru in accordance with the fuel pressure differential established across said restriction, a source of a substantially incompressible fluid under pressure, a control conduit connecting said source to a drain, two variable restrictions in series in said control conduit, first valve means responsive to the higher of said unequal air pressures for varying one of said variable restrictions, second valve means responsive to the temperature of the air entering said air conduit for varying the other of said variable restrictions, a valve in said control conduit downstream from said restrictions, means hydraulically connected across said first valve means and in series with said second valve means, and responsive to the difference of said two unequal pressures for applying an opening force to said valve, said means being also responsive to the pressure drop across said one restriction for applying a closing force to said valve, said two force applying means cooperating to control the flow thru said control conduit so as to maintain the pressure drop across said one restriction proportional to said difference of pressures, and means, including a hydraulic pressure connection from said control conduit, between said first and second restrictions, to said fuel conduit downstream from said metering restriction, and responsive to the pressure drop across said other restriction for controlling the fuel pressure differential across said metering restriction.

7. Control apparatus for maintaining a predetermined proportional relationship between the respective gravimetric rates of flow of a liquid and a gas, comprising: a first conduit for the flow of said gas, metering means in said first conduit for obtaining a gas pressure differential proportional to the volumetric rate of said gas flow; a source of hydraulic fluid at substantially constant pressure, a second conduit for the flow of said fluid from said source; first, second, and third variable restrictions successively in series in said second conduit, each having a valve means, for controlling said fluid flow; said third valve means being hydraulically connected across said second valve means and in series with said first valve means, for varying said third variable restriction to maintain the pressure differential across said second variable restriction in preselected proportional relationship with said gas pressure differential, said first valve means being thereby effective to determine the pressure differential across said first restriction and, when said first and second restrictions are fixed, to control the pressure differential across said first restriction in pre-established proportionality with said gas pressure differential and hence with said volumetric gas flow; said first valve means being responsive to the temperature of said gas at the inlet of said first conduit, and said second valve means being responsive to the higher component pressure of said gas pressure differential, or cooperatively varying said first and second variable restrictions respectively to render said fluid pressure differential across said first restriction substantially proportional to said gravimetric rate of said gas flow within a preselected range of said gas pressure differential; a third conduit for the flow of said liquid, an orifice in said third conduit for controlling the flows therethru as a function of the liquid pressure differential established thereacross, and fourth means, including a hydraulic pressure connection from said control conduit, between said first and second restrictions, to said fuel conduit downstream from said metering restriction, for controlling said liquid pressure differential in substantially constant proportion to said fluid pressure differential across said first variable restriction, whereby said rate of liquid flow is in said substantially constant proportion with said gravimetric rate of said gas flow.

8. Control apparatus as set forth in claim 7, including fifth means for varying the area of a portion of said first conduit to vary the value of said gas pressure differential corresponding to any given rate of said gas flow, and sixth means responsive to said fifth means for controlling said fourth means to vary said substantially constant proportionality between said liquid and said fluid pressure differentials by an amount corresponding to said variation in said value of said gas pressure differential.

9. Control apparatus as set forth in claim 7, including fifth means for varying the area of a portion of said first conduit to vary the value of said gas pressure differential corresponding to any given rate of said gas flow, sixth means responsive to said fifth means for controlling said fourth means to vary said substantially constant proportionality between said liquid and said fluid pressure differentials by an amount corresponding to said variation in said value of said gas pressure differential, and seventh means for limiting the value of said liquid pressure differential independently of said gas pressure differential.

10. Control apparatus as set forth in claim 7, including fifth means for varying the area of a portion of said first conduit to vary the value of said gas pressure differential corresponding to any given rate of said gas flow, sixth means responsive to said fifth means for controlling said fourth means to vary said substantially constant proportionality between said liquid and said fluid pressure differentials by an amount corresponding to said variation in said value of said gas pressure differential, and seventh means responsive to said fifth means for limiting said liquid pressure differential at a value predetermined by said fifth means.

11. A carburetor for an internal combustion engine, comprising a conduit for combustion air flowing to said engine, means associated with said air conduit for producing two unequal air pressures whose difference is a measure of the velocity of the air flowing therethru, a conduit for fuel flowing to said engine, a metering restriction in said fuel conduit for regulating the flow of fuel therethru in accordance with the fuel pressure differential established across said restriction, first control means responsive to the higher of said unequal air pressures, second control means responsive to the temperature of the air entering said air conduit, third control means responsive to said difference of air pressures, a channel for the flow of fuel from a point in said fuel conduit upstream from said restriction to the upstream side of said third control means, said first and second control means being in said channel and effective to control the flow therethru as a function of said higher air pressure and said air temperature, said third control means being adapted to regulate the pressure differential across said first control means proportionally to said air pressure differential, and means for regulating the pressure downstream from said restriction proportionally to the pressure upstream from said first control means.

JOHN H. STRESEN-REUTER.

REFERENCES CITED

The following references are of record in the file of this patent:

UNITED STATES PATENTS

| Number | Name | Date |
|---|---|---|
| 2,341,257 | Wunsch | Feb. 8, 1944 |
| 2,402,350 | Silver | June 18, 1946 |
| 2,419,523 | Adair | Apr. 29, 1947 |
| 2,427,834 | Campbell | Sept. 23, 1947 |
| 2,457,171 | Mock | Dec. 28, 1948 |